United States Patent
Fujita

(10) Patent No.: US 12,413,170 B2
(45) Date of Patent: Sep. 9, 2025

(54) POWER SOURCE DEVICE AND ELECTRIC POWER STEERING DEVICE

(71) Applicant: NSK LTD., Tokyo (JP)

(72) Inventor: Masahiko Fujita, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/840,476

(22) PCT Filed: May 19, 2023

(86) PCT No.: PCT/JP2023/018755
§ 371 (c)(1),
(2) Date: Jan. 15, 2025

(87) PCT Pub. No.: WO2024/062681
PCT Pub. Date: Mar. 28, 2024

(65) Prior Publication Data
US 2025/0167716 A1 May 22, 2025

(30) Foreign Application Priority Data
Sep. 22, 2022 (JP) .................. 2022-151189

(51) Int. Cl.
*H02P 29/024* (2016.01)
*B62D 5/04* (2006.01)

(52) U.S. Cl.
CPC ........ *H02P 29/0241* (2016.02); *B62D 5/0409* (2013.01)

(58) Field of Classification Search
CPC .............. B62D 5/0409; H02P 29/0241
See application file for complete search history.

(56) References Cited

U.S. PATENT DOCUMENTS

2016/0087572 A1* 3/2016 Kato ............... B60W 10/00
                                                318/504
2016/0134212 A1 5/2016 Kikuchi et al.
(Continued)

FOREIGN PATENT DOCUMENTS

CN     112187118 A  *  1/2021  ............. B60L 15/08
JP     H06-327263 A     11/1994
(Continued)

OTHER PUBLICATIONS

International Search Report in International Application No. PCT/JP2023/018755, dated Jul. 11, 2023.
(Continued)

*Primary Examiner* — Jacob D Knutson
(74) *Attorney, Agent, or Firm* — Sughrue Mion, PLLC

(57) ABSTRACT

A power source device including: a DC power source; an inverter to which power is supplied from the DC power source; a capacitor connected between the DC power source and the inverter in parallel with the inverter; a reverse connection protection circuit connected between the DC power source and the capacitor and configured to block current flowing through a positive electrode-side power source line of the DC power source from the capacitor to the DC power source; and an overvoltage protection circuit configured to control both-end voltage across the capacitor to a voltage less than or equal to a predetermined voltage when the both-end voltage becomes greater than or equal to the predetermined voltage.

8 Claims, 9 Drawing Sheets

(56) References Cited

U.S. PATENT DOCUMENTS

2018/0093702 A1* 4/2018 Nampei ............... B62D 5/0487
2019/0077441 A1* 3/2019 Sakashita ............ B62D 5/0484
2020/0321902 A1 10/2020 Kozawa

FOREIGN PATENT DOCUMENTS

| JP | 2003-204699 A | 7/2003 |
| JP | 2009-106055 A | 5/2009 |
| JP | 2011-211783 A | 10/2011 |
| JP | 2015-002634 A | 1/2015 |
| JP | 2020-174419 A | 10/2020 |
| JP | 2021-061682 A | 4/2021 |

OTHER PUBLICATIONS

Written Opinion in International Application No. PCT/JP2023/018755, dated Jul. 11, 2023.
International Preliminary Report on Patentability in International Application No. PCT/JP2023/018755, dated Sep. 7, 2023.
Kambham Rama, "Automotive 12- and 24-V Battery Input Protection Reference Design", Ti Designs, TIDUC41, Nov. 2016, pp. 1-35 (36 pages).
Communication dated Mar. 6, 2025, issued in European Application No. 23867812.2.
Communication dated Mar. 26, 2025, issued in European Application No. 23 867 812.2.
International Preliminary Report on Patentability dated Mar. 27, 2025, issued in International Application No. PCT/JP2023/018755.

* cited by examiner

POWER SOURCE DEVICE AND ELECTRIC POWER STEERING DEVICE

CROSS REFERENCE TO RELATED APPLICATIONS

This is a National Stage Application of International Application No. PCT/JP2023/018755 filed May 19, 2023, claiming priority based on Japanese Patent Application No. 2022-151189 filed Sep. 22, 2022.

TECHNICAL FIELD

The present invention relates to a power source device and an electric power steering device.

BACKGROUND ART

In PTL 1 described below, a power source device including a smoothing capacitor configured to smooth voltage rectified by a rectifier circuit, a detection circuit configured to detect voltage, and a cut-off circuit configured to connect the rectifier circuit and the smoothing capacitor when voltage detected by the detection circuit is less than a voltage determination value and release connection between the rectifier circuit and the smoothing capacitor when the voltage detected by the detection circuit is greater than or equal to the voltage determination value is described.

In PTL 2 described below, an overvoltage protection circuit configured to, when power source voltage increases to a voltage exceeding a target value, repeat charge and discharge of a capacitor by causing a transistor to perform switching operation according to terminal voltage of the capacitor and thereby limit the terminal voltage to a voltage value between an upper limit and a lower limit of protection setting voltage is described.

CITATION LIST

Patent Literature

PTL1: JP 2021-061682 A
PTL2: JP 2009-106055 A

SUMMARY OF INVENTION

Technical Problem

In some cases, in a power source device including an inverter to which power is supplied from a DC power source, in order to prevent a malfunction occurring when the DC power source is mistakenly connected in reverse polarity, a reverse connection protection circuit configured to block current flowing from the inverter side to the DC power source side is disposed between the DC power source and the inverter. When pulse signals are repeatedly applied to a power source line of such a power source device, both-end voltage across a capacitor connected between the DC power source and the inverter in parallel with the inverter increases and the high both-end voltage becomes a cause of a malfunction of the capacitor. Such application of pulse signals is performed in, for example, a transient emission test or a breakdown voltage pulse test (ISO 7632-2 test).

Since electric charge repeatedly flows into the capacitor due to application of pulse signals and discharge of the capacitor is prevented by the reverse connection protection circuit, electric charge is gradually accumulated in the capacitor. As a result, the both-end voltage across the capacitor exceeds a withstand voltage and becomes a cause of a malfunction of the capacitor.

An object of the present invention is to, even when in a case where between an inverter to which power is supplied from a DC power source and the DC power source, a reverse connection protection circuit configured to block current flowing from an inverter side to a DC power source side is disposed, pulse signals are repeatedly applied to a power source line from the DC power source, prevent both-end voltage across a capacitor connected between the DC power source and the inverter in parallel with the inverter from becoming excessive.

Solution to Problem

In order to achieve the above-described object, according to an aspect of the present invention, there is provided a power source device including: a DC power source; an inverter to which power is supplied from the DC power source; a capacitor connected between the DC power source and the inverter in parallel with the inverter; a reverse connection protection circuit connected between the DC power source and the capacitor and configured to block current flowing through a positive electrode-side power source line of the DC power source from the capacitor to the DC power source; and an overvoltage protection circuit configured to control both-end voltage across the capacitor to a voltage less than or equal to a predetermined voltage when the both-end voltage becomes greater than or equal to the predetermined voltage.

According to another aspect of the present invention, there is provided an electric power steering device including: the power source device described above; and an electric motor driven by the inverter in the power source device, wherein the electric power steering device provides a steering system of a vehicle with steering assist force by the electric motor.

Advantageous Effects of Invention

According to the present invention, it is possible to, even when pulse signals are repeatedly applied to a power source line from the DC power source, prevent both-end voltage across a capacitor connected between the DC power source and the inverter in parallel with the inverter from becoming excessive.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
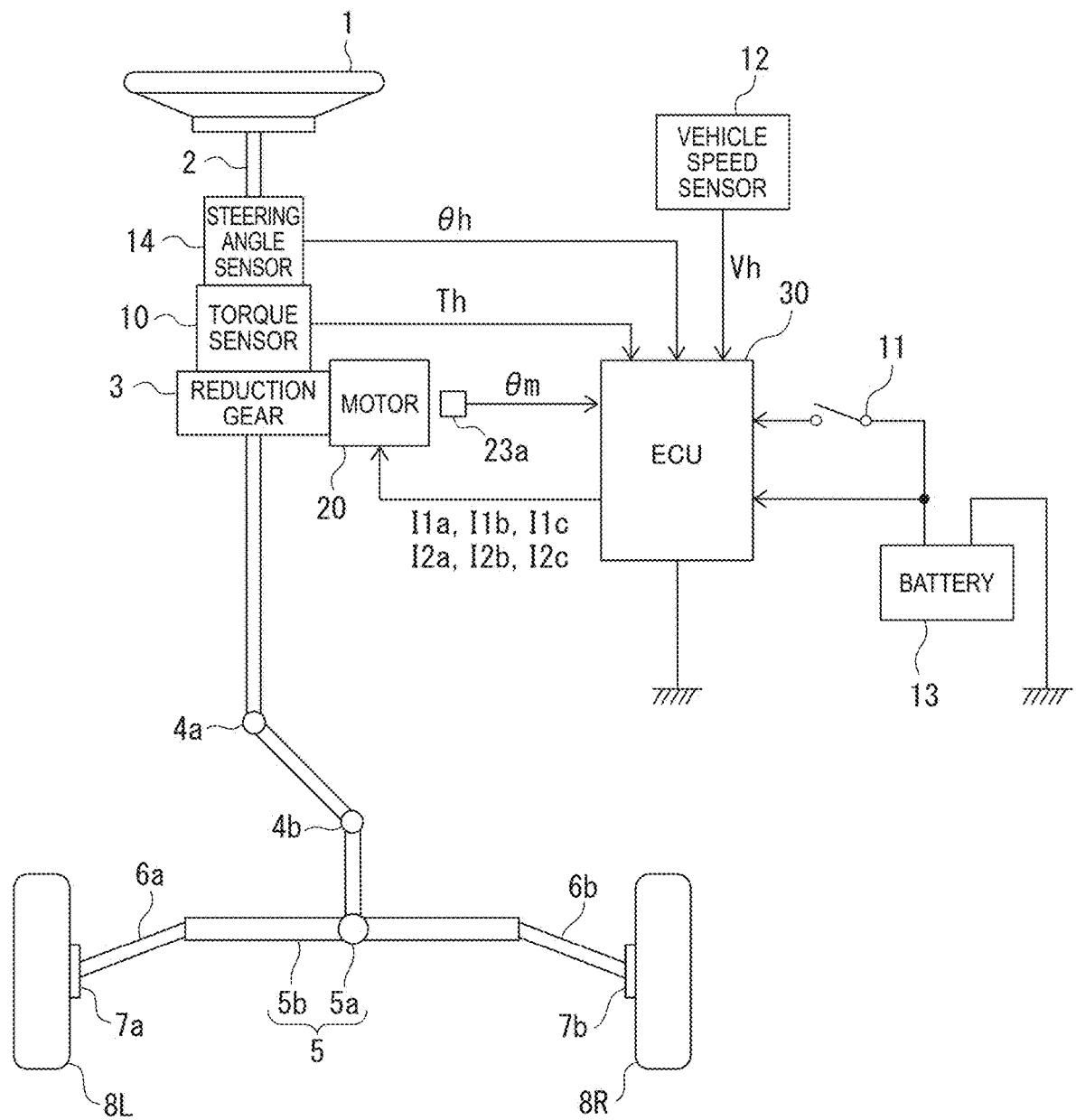
FIG. 1 is a configuration diagram illustrative of an outline of an example of an electric power steering device of an embodiment.

FIG. 1 is a configuration diagram illustrative of an outline of an example of an electric power steering (EPS) device of an embodiment. A steering shaft (steering wheel shaft) 2 of a steering wheel 1 is connected to steered wheels 8L and 8R by way of a reduction gear (worm gear) 3 that constitutes a speed reduction mechanism, universal joints 4a and 4b, a pinion rack mechanism 5, and tie rods 6a and 6b and further via hub units 7a and 7b.

The pinion rack mechanism 5 includes a pinion 5a that is coupled to a pinion shaft to which steering force is transmitted from the universal joint 4b and a rack 5b that meshes with the pinion 5a, and converts rotational motion transmitted to the pinion 5a to linear motion in the vehicle width direction by means of the rack 5b.

To the steering shaft 2, a torque sensor 10 configured to detect steering torque Th is disposed. To the steering shaft 2, a steering angle sensor 14 configured to detect a steering angle θh of the steering wheel 1 is also disposed.

A motor 20 configured to assist steering force of the steering wheel 1 is also connected to the steering shaft 2 via the reduction gear 3. The motor 20 may be, for example, a polyphase motor. Although, in the following description, an example of a three-phase motor having double windings in which first system coils and second system coils are wound in the same motor housing and a common rotor is rotated by the two systems of coils will be described, the motor 20 may be a motor other than a double-winding motor and the number of phases of the motor 20 does not have to be three. A plurality of motors 20 configured to assist steering force of the steering wheel 1 may be connected to the same steering shaft 2.

To an electronic control unit (ECU) 30 configured to control the electric power steering device, power is supplied from a battery 13 and an ignition key signal is also input by way of an ignition switch 11. The battery 13 and the ECU 30 are an example of a "power source device" described in the claims.

The ECU 30 performs calculation of a current command value of an assist control command, based on steering torque Th detected by the torque sensor 10, vehicle speed Vh detected by a vehicle speed sensor 12, and a steering angle θh detected by the steering angle sensor 14 and controls current to be supplied to the motor 20 (A-phase current I1a, B-phase current I1b, and C-phase current I1c flowing through the first system coils and A-phase current I2a, B-phase current I2b, and C-phase current I2c flowing through the second system coils) by a voltage control command value obtained by performing compensation and the like on the calculated current command value. The ECU 30 is an example of a "motor control device" described in the claims.

Note that the steering angle sensor 14 is not an essential component and the steering angle θh may be calculated by adding a torsion angle of a torsion bar in the torque sensor 10 to a product of a motor rotation angle θm obtained from a rotation angle sensor 23a configured to detect a rotation angle of the rotation shaft of the motor 20 and a gear ratio of the reduction gear 3. As the rotation angle sensor 23a, for example, a resolver that detects a rotational position of a motor or a magnetic sensor that detects a magnetic field of a magnet attached to the rotation shaft of the motor 20 can be made use of. In addition, a turning angle of the steered wheels 8L and 8R may be used in place of the steering angle θh. The turning angle may be detected by, for example, detecting a displacement amount of the rack 5b.

The ECU 30 includes, for example, a computer including a processor and peripheral components, such as a storage device. The processor may be, for example, a central processing unit (CPU) or a micro-processing unit (MPU).

The storage device may include any one of a semiconductor storage device, a magnetic storage device, and an optical storage device. The storage device may include a memory, such as a read only memory (ROM) and a random access memory (RAM), that is used as registers, a cache memory, or a main storage device.

Functions of the ECU 30, which will be described below, are achieved by, for example, the processor of the ECU 30 executing computer programs stored in the storage device.

Note that the ECU 30 may be formed by use of dedicated hardware for executing each type of information processing that will be described below.

For example, the ECU 30 may include functional logic circuits that are implemented in a general-purpose semiconductor integrated circuit. For example, the ECU 30 may have a programmable logic device (PLD), such as a field-programmable gate array (FPGA).

Figure 2:
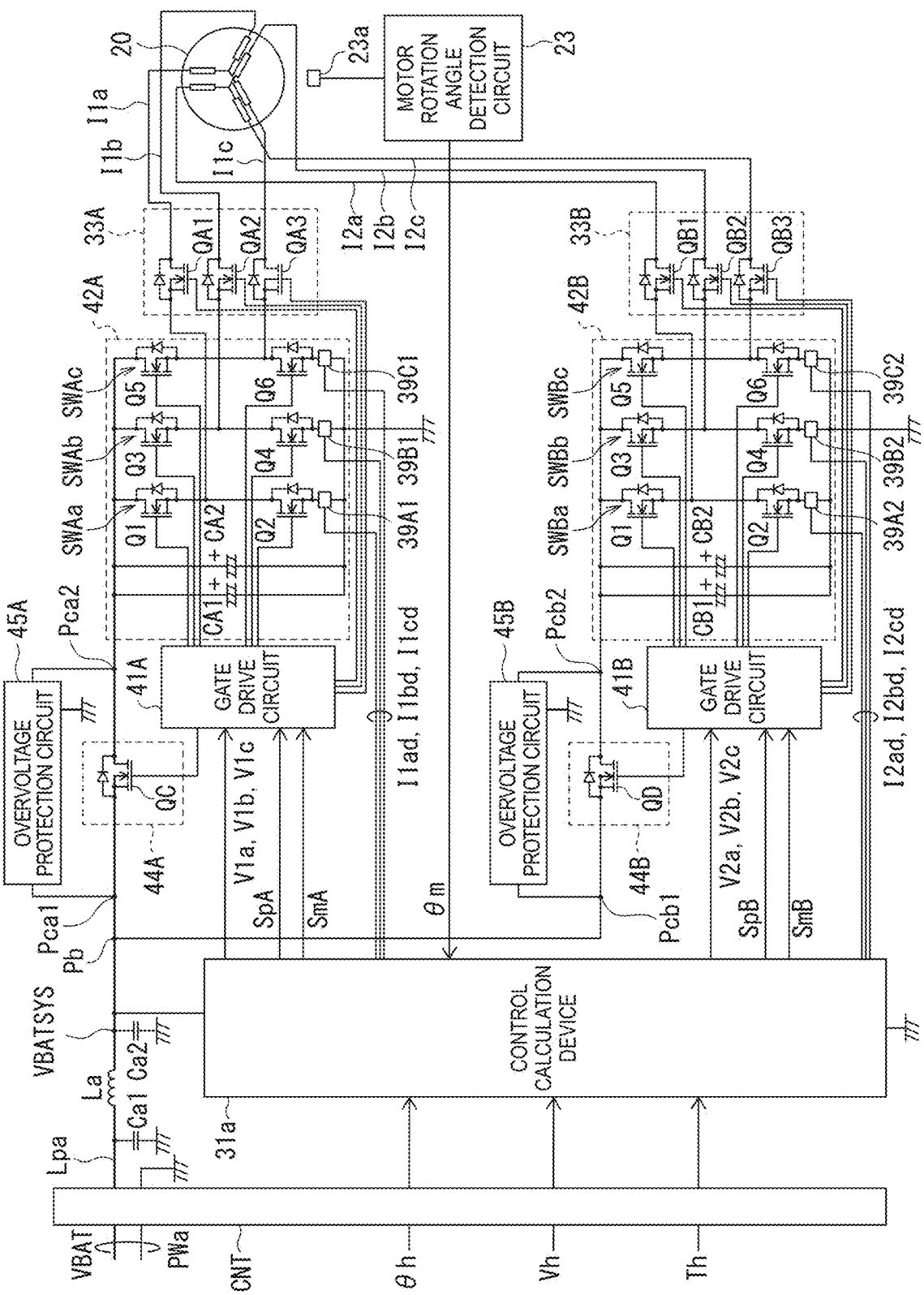
FIG. 2 is a configuration diagram illustrative of an outline of an example of an electronic control unit (ECU) of the embodiment.

FIG. 2 is a configuration diagram illustrative of an outline of an example of the ECU 30 of the embodiment. The ECU 30 includes a motor rotation angle detection circuit 23, a control calculation device 31a, a first motor current cut-off circuit 33A and a second motor current cut-off circuit 33B, a first gate drive circuit 41A and a second gate drive circuit 41B, a first power conversion circuit 42A and a second power conversion circuit 42B, a first reverse connection protection circuit 44A and a second reverse connection protection circuit 44B, and an overvoltage protection circuits 45A and 45B.

To the ECU 30, a power wiring PWa that transmits power from the battery 13 is connected via a connector CNT. A positive electrode-side power source line Lpa of the power wiring PWa is connected to the control calculation device 31a by way of a noise filter circuit, such as an electromagnetic compatibility (EMC) filter, that is formed by a choke coil La and ceramic capacitors Ca1 and Ca2 and also branches at a branch point Pb, and branched lines are connected to the first reverse connection protection circuit 44A and the second reverse connection protection circuit 44B.

One end of the choke coil La is connected to the positive electrode-side power source line Lpa and one end of the ceramic capacitor Ca1, the other end of the choke coil La is connected to one end of the ceramic capacitor Ca2, the control calculation device 31a, and the branch point Pb, and the other ends of the ceramic capacitors Ca1 and Ca2 are grounded. On the other hand, a negative electrode-side line of the power wiring PWa is connected to a ground line of the ECU 30.

To the control calculation device 31a, signals representing the steering torque Th detected by the torque sensor 10, the vehicle speed Vh detected by the vehicle speed sensor 12, and the steering angle θh detected by the steering angle sensor 14 are transmitted via the connector CNT.

The control calculation device 31a calculates current command values that are control target values of driving currents of the motor 20, based on at least the steering torque Th and outputs voltage control command values V1a, V1b, V1c, V2a, V2b, and V2c obtained by performing compensation and the like on the current command values to the first gate drive circuit 41A and the second gate drive circuit 41B. The voltage control command values V1a, V1b, and V1c are an A-phase voltage control command value, a B-phase voltage command value, and a C-phase voltage command value of the first system coils, respectively, and the voltage control command values V2a, V2b, and V2c are an A-phase voltage control command value, a B-phase voltage command value, and a C-phase voltage command value of the second system coils, respectively.

The first reverse connection protection circuit 44A includes a field effect transistor (FET) QC configured to perform connection or cut-off between the positive electrode-side power source line Lpa and the first power conversion circuit 42A. A source of the FET QC is connected to the positive electrode-side power source line Lpa, and a drain of the FET QC is connected to a drain of each of FETs Q1, Q3, and Q5 in the first power conversion circuit 42A. The control calculation device 31a outputs a control signal SpA to control conduction and cut-off of the first reverse connection protection circuit 44A to the first gate drive circuit 41A. The first gate drive circuit 41A outputs a gate signal for the FET QC in accordance with the control signal SpA and thereby controls on and off states of the FET QC.

Since an anode of a parasitic diode of the FET QC is connected to the positive electrode-side power source line Lpa and a cathode of the parasitic diode is connected to the first power conversion circuit 42A, current that flows through the positive electrode-side power source line from the first power conversion circuit 42A side to the battery 13 side is blocked when the FET QC is turned off. As a result, the first power conversion circuit 42A can be protected from damage even when the battery 13 is mistakenly connected in reverse polarity.

In addition, the second reverse connection protection circuit 44B includes an FET QD configured to perform connection or cut-off between the positive electrode-side power source line Lpa and the second power conversion circuit 42B. A source of the FET QD is connected to the positive electrode-side power source line Lpa, and a drain of the FET QD is connected to a drain of each of FETs Q1, Q3, and Q5 in the second power conversion circuit 42B. The control calculation device 31a outputs a control signal SpB to control conduction and cut-off of the second reverse connection protection circuit 44B to the second gate drive circuit 41B. The second gate drive circuit 41B outputs a gate signal for the FET QD in accordance with the control signal SpB and thereby controls on and off states of the FET QD.

Since an anode of a parasitic diode of the FET QD is connected to the positive electrode-side power source line Lpa and a cathode of the parasitic diode is connected to the second power conversion circuit 42B, current that flows through the positive electrode-side power source line from the first power conversion circuit 42B side to the battery 13 side is blocked when the FET QD is turned off. As a result, the second power conversion circuit 42B can be protected from damage even when the battery 13 is mistakenly connected in reverse polarity.

When the voltage control command values V1a, V1b, and V1c are input from the control calculation device 31a, the first gate drive circuit 41A forms six gate signals that are generated by pulse width modulation (PWM) based on the voltage control command values V1a, V1b, and V1c and triangular-wave carrier signals. The first gate drive circuit 41A outputs the gate signals to the first power conversion circuit 42A.

When the voltage control command values V2a, V2b, and V2c are input from the control calculation device 31a, the second gate drive circuit 41B forms six gate signals that are generated by pulse width modulation (PWM) based on the voltage control command values V2a, V2b, and V2c and triangular-wave carrier signals. The second gate drive circuit 41B outputs the gate signals to the second power conversion circuit 42B.

The first power conversion circuit 42A includes an inverter including three switching arms SWAa, SWAb, and SWAc each of which is formed by FETs serving as switching elements and electrolytic capacitors CA1 and CA2.

The switching arms SWAa, SWAb, and SWAc are connected in parallel with one another. The switching arm SWAa of the A-phase includes the FETs Q1 and Q2 that are connected in series, the switching arm SWAb of the B-phase includes the FETs Q3 and Q4 that are connected in series, and the switching arm SWAc of the C-phase includes the FETs Q5 and Q6 that are connected in series.

To a gate of each of the FETs Q1 to Q6, one of the gate signals output from the first gate drive circuit 41A is input, and the gate signals cause the A-phase current I1a, the B-phase current I1b, and the C-phase current I1c to be flowed from connection points between the FETs in the switching arms SWAa, SWAb, and SWAc to an A-phase winding, a B-phase winding, and a C-phase winding of the first system coils of the motor 20 via the first motor current cut-off circuit 33A, respectively.

The electrolytic capacitors CA1 and CA2 have a noise removal function and a power supply assist function for the first power conversion circuit 42A. The electrolytic capacitors CA1 and CA2 may be, for example, hybrid capacitors in which an electrolyte obtained by blending a conductive polymer and an electrolytic solution is employed.

The second power conversion circuit 42B includes an inverter including three switching arms SWBa, SWBb, and SWBc each of which is formed by FETs serving as switching elements and electrolytic capacitors CB1 and CB2.

The switching arms SWBa, SWBb, and SWBc are connected in parallel with one another. The switching arm SWBa of the A-phase includes the FETs Q1 and Q2 that are connected in series, the switching arm SWBb of the B-phase includes the FETs Q3 and Q4 that are connected in series, and the switching arm SWBc of the C-phase includes the FETs Q5 and Q6 that are connected in series.

To a gate of each of the FETs Q1 to Q6, one of the gate signals output from the second gate drive circuit 41B is input, and the gate signals cause the A-phase current I2a, the B-phase current I2b, and the C-phase current I2c to be flowed from connection points between the FETs in the switching arms SWBa, SWBb, and SWBc to an A-phase winding, a B-phase winding, and a C-phase winding of the second system coils of the motor 20 via the second motor current cut-off circuit 33B, respectively.

The electrolytic capacitors CB1 and CB2 have a noise removal function and a power supply assist function for the second power conversion circuit 42B. The electrolytic capacitors CB1 and CB2 may be, for example, hybrid capacitors.

Note that the first power conversion circuit 42A and the second power conversion circuit 42B may be power conversion circuits that supply three-phase currents to two different motors each of which generates steering assist force assisting steering of the steering wheel 1. For example, the two different motors may be connected to the same steering shaft 2 via a reduction gear.

On the source sides of the FETs Q2, Q4, and Q6 that form lower-side arms of the switching arms SWAa, SWAb, and SWAc in the first power conversion circuit 42A, current detection circuits 39A1, 39B1, and 39C1 are disposed, respectively. The current detection circuits 39A1, 39B1, and 39C1 detect downstream-side currents of the switching arms SWAa, SWAb, and SWAc as the A-phase current, the B-phase current, and the C-phase current of the first system coils and output detected values I1ad, I1bd, and I1cd of the A-phase current, the B-phase current, and the C-phase current of the first system coils, respectively.

On the source sides of the FETs Q2, 04, and Q6 that form lower-side arms of the switching arms SWBa, SWBb, and SWBc in the second power conversion circuit 42B, current detection circuits 39A2, 39B2, and 39C2 are disposed, respectively. The current detection circuits 39A2, 39B2, and 39C2 detect downstream-side currents of the switching arms SWBa, SWBb, and SWBc as the A-phase current, the B-phase current, and the C-phase current of the second system coils and output detected values I2ad, I2bd, and I2cd of the A-phase current, the B-phase current, and the C-phase current of the second system coils, respectively.

The first motor current cut-off circuit 33A includes three FETs QA1, QA2, and QA3 for current cut-off. A source of the FET QA1 is connected to the connection point between the FETs Q1 and Q2 of the switching arm SWAa in the first power conversion circuit 42A, and a drain of the FET QA1 is connected to the A-phase winding of the first system coils in the motor 20. A source of the FET QA2 is connected to the connection point between the FETs Q3 and Q4 of the switching arm SWAb, and a drain of the FET QA2 is connected to the B-phase winding of the first system coils. A source of the FET QA3 is connected to the connection point between the FETs Q5 and Q6 of the switching arm SWAc, and a drain of the FET QA3 is connected to the C-phase winding of the first system coils.

The control calculation device 31a outputs a control signal SmA to control conduction and cut-off of the first motor current cut-off circuit 33A to the first gate drive circuit 41A. The first gate drive circuit 41A outputs gate signals for the FETs QA1 to QA3 in accordance with the control signal SmA and thereby flows or cuts off the A-phase current I1a, the B-phase current I1b, and the C-phase current I1c from the first power conversion circuit 42A to the motor 20, respectively.

The second motor current cut-off circuit 33B includes three FETs QB1, QB2, and QB3 for current cut-off. A source of the FET QB1 is connected to the connection point between the FETs Q1 and Q2 of the switching arm SWBa in the second power conversion circuit 42B, and a drain of the FET QB1 is connected to the A-phase winding of the second system coils in the motor 20. A source of the FET QB2 is connected to the connection point between the FETs Q3 and Q4 of the switching arm SWBb, and a drain of the FET QB2 is connected to the B-phase winding of the second system coils. A source of the FET QB3 is connected to the connection point between the FETs Q5 and Q6 of the switching arm SWBc, and a drain of the FET QB3 is connected to the C-phase winding of the second system coils.

The control calculation device 31a outputs a control signal SmB to control conduction and cut-off of the second motor current cut-off circuit 33B to the second gate drive circuit 41B. The second gate drive circuit 41B outputs gate signals for the FETs QB1 to QB3 in accordance with the control signal SmB and thereby flows or cuts off the A-phase current I2a, the B-phase current I2b, and the C-phase current I2c from the second power conversion circuit 42B to the motor 20, respectively.

The motor rotation angle detection circuit 23 acquires a detected value from the rotation angle sensor 23a and detects the motor rotation angle θm that is a rotation angle of the rotation shaft of the motor 20. The motor rotation angle detection circuit 23 outputs the motor rotation angle θm to the control calculation device 31a.

The control calculation device 31a acquires, via a not-illustrated A/D conversion unit, the detected values I1ad, I1bd, and I1cd of the A-phase current, the B-phase current, and the C-phase current of the first system coils and the detected values I2ad, I2bd, and I2cd of the A-phase current, the B-phase current, and the C-phase current of the second system coils.

Figure 3:
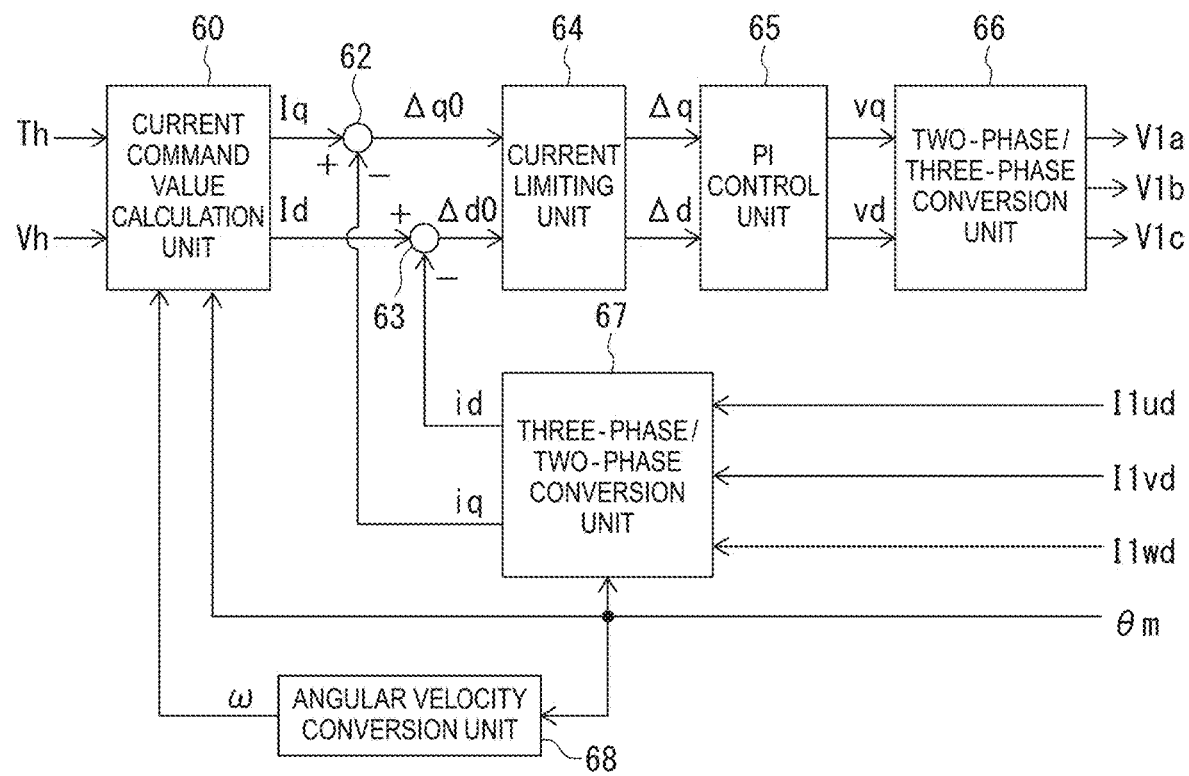
FIG. 3 is a block diagram of an example of a functional configuration of a control calculation device.

FIG. 3 is a block diagram of an example of a functional configuration of the control calculation device 31a. Note that although, in FIG. 3, only a functional configuration to drive the first system coils of the motor 20 is described, a functional configuration to drive the second system coils also has the same configuration.

The control calculation device 31a includes a current command value calculation unit 60, subtracters 62 and 63, a current limiting unit 64, a proportional-integral (PI) control unit 65, a two-phase/three-phase conversion unit 66, a three-phase/two-phase conversion unit 67, and an angular velocity conversion unit 68 and drives the motor 20 by vector control.

The current command value calculation unit 60 calculates a q-axis current command value Iq and a d-axis current command value Id that are required to be flowed through the motor 20, based on the steering torque Th, the vehicle speed Vh, the motor rotation angle θm of the motor 20, and rotational angular velocity ω of the motor 20.

On the other hand, the detected values I1ad, I1bd, and I1cd of the A-phase current, the B-phase current, and the C-phase current flowing through the first system coils of the motor 20 that are detected by the current detection circuits 39A1, 39B1, and 39C1, respectively are converted to currents id and iq in two axes, namely the d-axis and the q-axis, by the three-phase/two-phase conversion unit 67.

The subtracters 62 and 63, by subtracting the fed-back currents iq and id from the q-axis current command value Iq and the d-axis current command value Id, calculates q-axis deviation current Δq0 and d-axis deviation current Δd0, respectively.

The current limiting unit 64 limits upper limits of the q-axis deviation current Δq0 and the d-axis deviation current Δd0. The q-axis deviation current Δq and the d-axis deviation current Δd after limitation are input to the PI control unit 65.

The PI control unit 65 calculates voltage command values vq and vd that bring the q-axis deviation current Δq and the d-axis deviation current Δd to 0, respectively. The two-phase/three-phase conversion unit 66 converts the voltage command values vd and vq to the A-phase voltage control command value V1a, the B-phase voltage command value V1b, and the C-phase voltage command value V1c for the first system of the motor 20 and outputs the A-phase voltage control command value V1a, the B-phase voltage command value V1b, and the C-phase voltage command value V1c to the first gate drive circuit 41A.

The angular velocity conversion unit 68 calculates the rotational angular velocity ω of the motor 20, based on temporal change in the motor rotation angle θm. The motor rotation angle θm and the rotational angular velocity ω are input to the current command value calculation unit 60 and are used for the vector control.

FIG. 2 is now referred to again. The overvoltage protection circuit 45A is connected to connection points Pca1 and Pca2 in parallel with the first reverse connection protection circuit 44A. The connection point Pca1 is a point at which the first reverse connection protection circuit 44A is connected to the positive electrode-side power source line Lpa side, and the connection point Pca2 is a point at which the first reverse connection protection circuit 44A is connected to the electrolytic capacitors CA1 and CA2 side.

The overvoltage protection circuit 45A prevents both-end voltage across the electrolytic capacitors CA1 and CA2 from becoming excessive when pulse signals are repeatedly applied to the positive electrode-side power source line Lpa while the FET QC in the first reverse connection protection circuit 44A is in an off-state. For example, the overvoltage protection circuit 45A prevents the both-end voltage from becoming greater than or equal to withstand voltage of the electrolytic capacitors CA1 and CA2.

Such application of pulse signals is performed in, for example, a transient emission test or a breakdown voltage pulse test (ISO 7632-2 test). The ISO 7632-2 test is sometimes conducted for both a case where the FET QC in the first reverse connection protection circuit 44A is in the on state and a case where the FET QC is in the off state.

In the case where as in a circuit configuration illustrated in FIG. 2, no rectifying element that blocks current flowing through the positive electrode-side power source line Lpa from the battery 13 side to the electrolytic capacitors CA1 and CA2 side exists, when a pulse signal is applied to the positive electrode-side power source line Lpa, electric charge flows into the electrolytic capacitors CA1 and CA2 via a channel of the FET QC when the FET QC in the first reverse connection protection circuit 44A is in the on state or via the parasitic diode when the FET QC is in the off state.

When the FET QC is in the off state on this occasion, discharge of electric charge from the electrolytic capacitors CA1 and CA2 is prevented by the parasitic diode of the FET QC. As a result, electric charge is gradually accumulated in the electrolytic capacitors CA1 and CA2. When the both-end voltage across the electrolytic capacitors CA1 and CA2 exceeds the withstand voltage because of the accumulation of electric charge, the excessive voltage becomes a cause of a malfunction of the electrolytic capacitors CA1 and CA2.

Thus, the overvoltage protection circuit 45A controls both-end voltage VR across the electrolytic capacitors CA1 and CA2 to a voltage less than or equal to a predetermined voltage when the both-end voltage VR across the electrolytic capacitors CA1 and CA2 becomes greater than or equal to the predetermined voltage. For example, the overvoltage protection circuit 45A may be a discharge circuit that discharges electric charge accumulated in the electrolytic capacitors CA1 and CA2 and thereby controls the both-end voltage VR across the electrolytic capacitors CA1 and CA2 to a voltage less than or equal to the predetermined voltage when the both-end voltage VR across the electrolytic capacitors CA1 and CA2 becomes greater than or equal to the predetermined voltage.

Likewise, the overvoltage protection circuit 45B is connected to connection points Pcb1 and Pcb2 in parallel with the second reverse connection protection circuit 44B. The connection point Pcb1 is a point at which the second reverse connection protection circuit 44B is connected to the positive electrode-side power source line Lpa side, and the connection point Pcb2 is a point at which the second reverse connection protection circuit 44B is connected to the electrolytic capacitors CB1 and CB2 side.

The overvoltage protection circuit 45B prevents both-end voltage across the electrolytic capacitors CB1 and CB2 from becoming excessive when pulse signals are repeatedly applied to the positive electrode-side power source line Lpa while the FET QD in the second reverse connection protection circuit 44B is in the off-state.

Figure 4A:
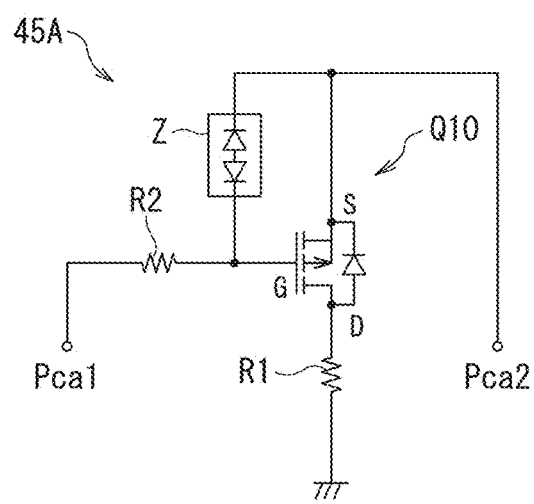
FIGS. 4A and 4B are configuration diagrams illustrative of outlines of a first example and a second example of an overvoltage protection circuit, respectively.
Figure 4B:
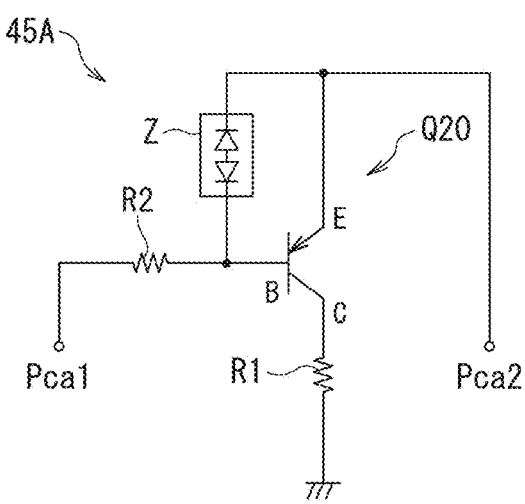

FIGS. 4A and 4B are configuration diagrams illustrative of outlines of a first example and a second example of the overvoltage protection circuit 45A, respectively. The overvoltage protection circuit 45B may have the same configuration as the overvoltage protection circuit 45A.

FIG. 4A is now referred to. The overvoltage protection circuit 45A includes a P-channel type FET Q10 that is a switching element connected between the connection point Pca2 and the ground line and configured to perform connection or cut-off between the connection point Pca2 and the ground line and a discharge resistor R1 that is connected in series between the FET Q10 and the ground line. A gate electrode of the FET Q10 that is a control electrode is connected to the connection point Pca1. A source electrode of the FET Q10 that is a first main electrode is connected to the connection point Pca2. A drain electrode of the FET Q10 that is a second main electrode is connected to the ground line via the discharge resistor R1. Between the gate electrode and the source electrode of the FET Q10, a Zener diode z configured to protect the FET Q10 in such a manner that gate-source voltage does not exceed breakdown voltage may be connected. In addition, between the gate electrode of the FET Q10 and the connection point Pca1, a protection resistor R2 may be connected.

FIG. 4B is now referred to. The overvoltage protection circuit 45A in FIG. 4B includes a PNP-type transistor Q20 as a switching element connected between the connection point Pca2 and the ground line and configured to perform connection or cut-off between the connection point Pca2 and the ground line. A discharge resistor R1 is connected in series between the transistor Q20 and the ground line. A base electrode of the transistor Q20 that is a control electrode is connected to the connection point Pca1. An emitter electrode of the transistor Q20 that is a first main electrode is connected to the connection point Pca2. A collector electrode of the transistor Q20 that is a second main electrode is connected to the ground line via the discharge resistor R1. Between the base electrode and the emitter electrode of the transistor Q20, a Zener diode z configured to protect the transistor Q20 in such a manner that base-emitter voltage does not exceed breakdown voltage may be connected. In addition, between the base electrode of the transistor Q20 and the connection point Pca1, a protection resistor R2 may be connected.

An operation example of the overvoltage protection circuit 45A when pulse signals are repeatedly applied to the positive electrode-side power source line Lpa while the FET QC in the first reverse connection protection circuit 44A is in the off-state (when, for example, an ISO 7632-2 test is performed) will be described below.

First, in an initial state before application of a pulse signal, the FET QC in the first reverse connection protection circuit 44A is controlled to the off state. When in this state, battery voltage VBAT of the battery 13, power source voltage VBATSYS at an output of the noise filter circuit (a connection point between the choke coil La and the ceramic capacitor Ca2), and the both-end voltage VR across the electrolytic capacitors CA1 and CA2 are the same. Values of VBAT, VBATSYS, and VR in the initial state are referred to as "initial value V0".

When subsequently, a pulse signal for test is applied to the power wiring PWa, the battery voltage VBAT and the power source voltage VBATSYS fluctuate due to the pulse signal. Note that voltage fluctuation of the power source voltage VBATSYS is smaller than voltage fluctuation of the battery voltage VBAT under the influence of loads, such as the noise filter circuit and the control calculation device 31a.

Due to the voltage fluctuation of the power source voltage VBATSYS, electric charge is accumulated in the electrolytic capacitors CA1 and CA2 by way of the parasitic diode of the FET QC in the first reverse connection protection circuit 44A. As a result, although when application of one pulse signal ends, the battery voltage VBAT and the power source voltage VBATSYS return to the initial value V0, the both-end voltage VR across the electrolytic capacitors CA1 and CA2 becomes higher than the initial value V0. Thus, when pulse signals are repeatedly applied, the both-end voltage VR gradually increases.

Subsequently, the both-end voltage VR continues to increase due to application of pulse signals, and a sum of negative gate threshold voltage Vth (<0) of the FET Q10 and the both-end voltage VR becomes higher than the power source voltage VBATSYS (VR+Vth>VBATSYS). Alternatively, the both-end voltage VR becomes higher than a sum of base-emitter threshold voltage Vth of the transistor Q20 and the power source voltage VBATSYS.

Then, the FET Q10 or the transistor Q20 is turned on, electric charge in the electrolytic capacitors CA1 and CA2 flows to the ground line by way of the FET Q10 or the transistor Q20 and the discharge resistor R1, and the electrolytic capacitors CA1 and CA2 are discharged. Through this operation, the both-end voltage VR decreases. That is, the overvoltage protection circuit 45A discharges the electrolytic capacitors CA1 and CA2 when voltage between the connection point Pca1 and the connection point Pca2 becomes greater than or equal to an absolute value |Vth| of the threshold voltage of the FET Q10 or the transistor Q20.

Subsequently, when the sum of the gate threshold voltage Vth of the FET Q10 and the both-end voltage VR becomes less than or equal to the power source voltage VBATSYS (VR+Vth≤VBATSYS), the FET Q10 is turned off. Alternatively, when the both-end voltage VR becomes less than or equal to the sum of the threshold voltage Vth of the transistor Q20 and the power source voltage VBATSYS, the FET Q10 is turned off. As a result, the discharge of the electrolytic capacitors CA1 and CA2 ends.

Since from this time onward, turning on and off of the FET Q10 or the transistor Q20 is repeated in association with application of pulse signals, the both-end voltage VR stabilizes to a value of a sum of the power source voltage VBATSYS and the absolute value |Vth| of the threshold voltage. That is, the overvoltage protection circuit 45A controls the both-end voltage VR to a value less than or equal to the sum of the power source voltage VBATSYS and the absolute value |Vth| of the threshold voltage when the voltage between the connection point Pca1 and the connection point Pca2 becomes greater than or equal to the absolute value |Vth| of the threshold voltage of the FET Q10 or the transistor Q20. Because of this configuration, the both-end voltage VR across the electrolytic capacitors CA1 and CA2 can be prevented from becoming excessive (for example, exceeding the withstand voltage of the electrolytic capacitors CA1 and CA2).

(Variations)

Figure 5:
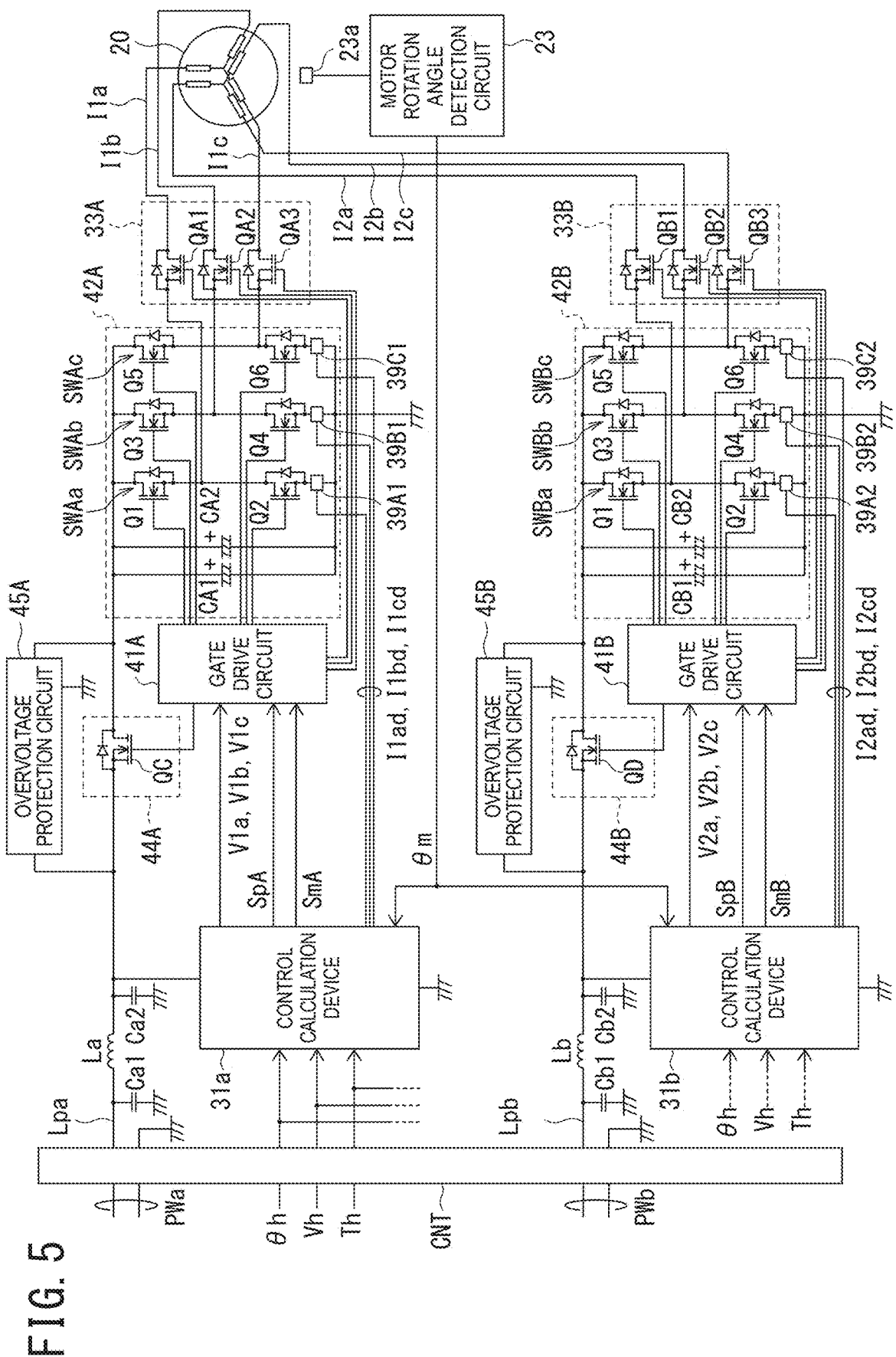
FIG. 5 is a configuration diagram illustrative of an outline of a first variation of the electronic control unit.

(1) FIG. 5 is a configuration diagram illustrative of an outline of a first variation of the ECU 30. The electric power steering device may separately include, as the battery 13, a first battery configured to supply power to the first power conversion circuit 42A by way of a first power wiring PWa and a second battery configured to supply power to the second power conversion circuit 42B by way of a second power wiring PWb.

The positive electrode-side power source line Lpa of the first power wiring PWa is connected to the control calculation device 31a by way of a noise filter circuit that is formed by a choke coil La and ceramic capacitors Ca1 and Ca2 and is also connected to the first reverse connection protection circuit 44A.

A positive electrode-side power source line Lpb of the second power wiring PWb is connected to a control calculation device 31b by way of a noise filter circuit that is formed by a choke coil Lb and ceramic capacitors Cb1 and Cb2 and is also connected to the second reverse connection protection circuit 44B.

One end of the choke coil Lb is connected to the positive electrode-side power source line Lpb and one end of the ceramic capacitor Cb1, the other end of the choke coil Lb is connected to one end of the ceramic capacitor Cb2 and the control calculation device 31b, and the other ends of the ceramic capacitors Cb1 and Cb2 are grounded. On the other hand, a negative electrode-side line of the second power wiring PWb is connected to the ground line of the ECU 30.

To the control calculation devices 31a and 31b, signals representing the steering torque Th detected by the torque sensor 10, the vehicle speed Vh detected by the vehicle speed sensor 12, and the steering angle θh detected by the steering angle sensor 14 are transmitted via the connector CNT.

The control calculation device 31a calculates current command values that are control target values of driving currents of the motor 20, based on at least the steering torque Th and outputs voltage control command values V1a, V1b, and V1c obtained by performing compensation and the like on the current command values to the first gate drive circuit 41A. In addition, the control calculation device 31a generates the control signal SpA to control the first reverse connection protection circuit 44A and the control signal SmA to control the first motor current cut-off circuit 33A and outputs the generated signals to the first gate drive circuit 41A.

The control calculation device 31b calculates current command values that are control target values of driving currents of the motor 20, based on at least the steering torque Th and outputs voltage control command values V2a, V2b, and V2c obtained by performing compensation and the like on the current command values to the second gate drive circuit 41B. In addition, the control calculation device 31b generates the control signal SpB to control the second reverse connection protection circuit 44B and the control signal SmB to control the second motor current cut-off circuit 33B and outputs the generated signals to the second gate drive circuit 41B.

Note that it may be configured such that the control calculation device 31a and the control calculation device 31b are integrated into a single control calculation device and power is supplied to the single control calculation device from the positive electrode-side power source line Lpa of the first power wiring PWa or the positive electrode-side power source line Lpb of the second power wiring PWb.

Figure 6:
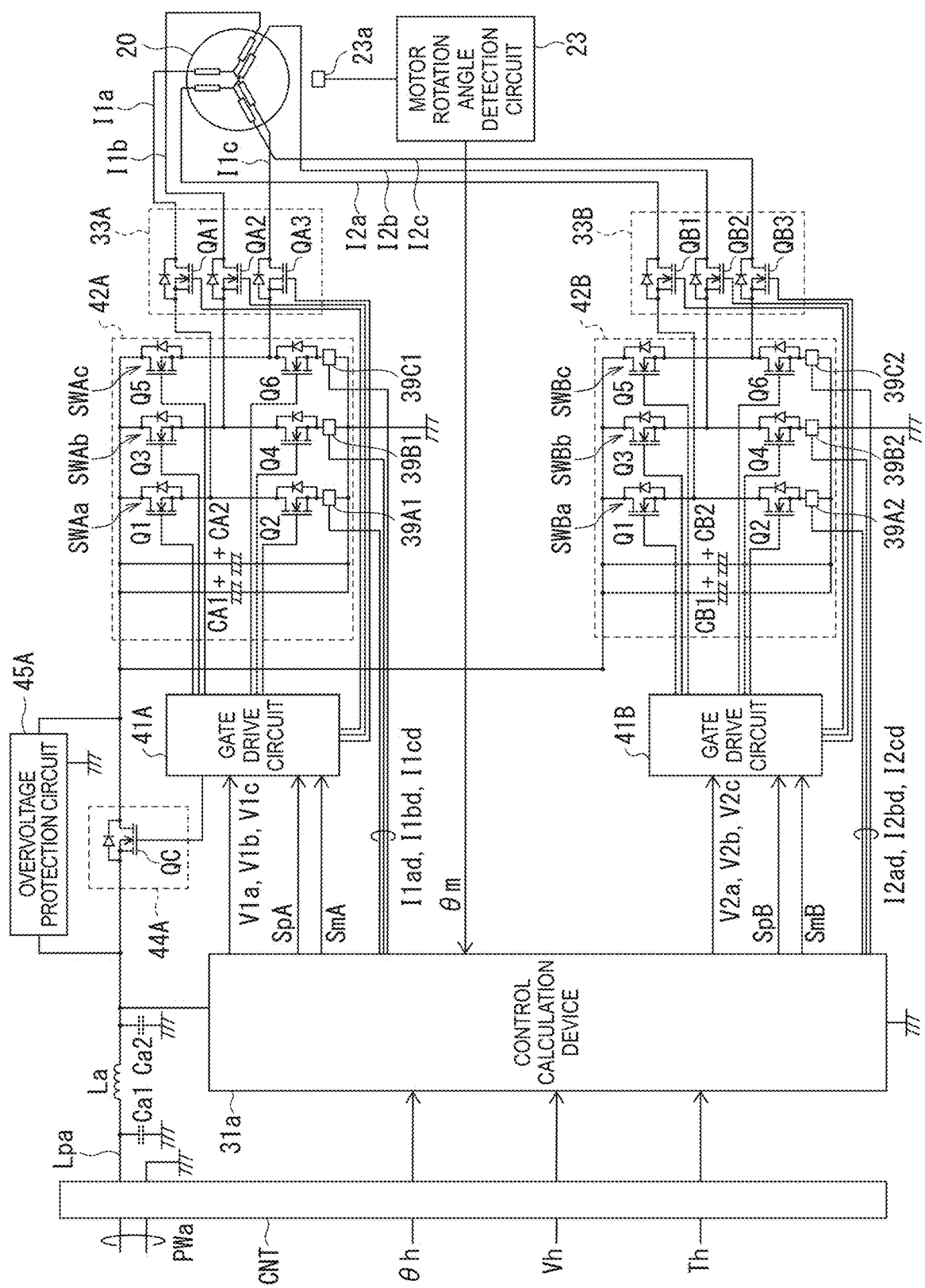
FIG. 6 is a configuration diagram illustrative of an outline of a second variation of the electronic control unit.

(2) FIG. 6 is a configuration diagram illustrative of an outline of a second variation of the ECU 30. The second variation of the ECU 30 includes a single first reverse connection protection circuit 44A by integrating the first reverse connection protection circuit 44A and the second reverse connection protection circuit 44B. The positive electrode-side power source line Lpa of the power wiring PWa branches at a point between the first reverse connection protection circuit 44A and the first power conversion circuit 42A, and branched lines are connected to the first power conversion circuit 42A and the second power conversion circuit 42B.

The overvoltage protection circuit 45A configured to prevent the both-end voltages VR across the electrolytic capacitors CA1, CA2, CB1, and CB2 from becoming excessive is connected in parallel with the first reverse connection protection circuit 44A. That is, it is sufficient to have the same number of overvoltage protection circuits as the number of reverse connection protection circuits.

Figure 7:
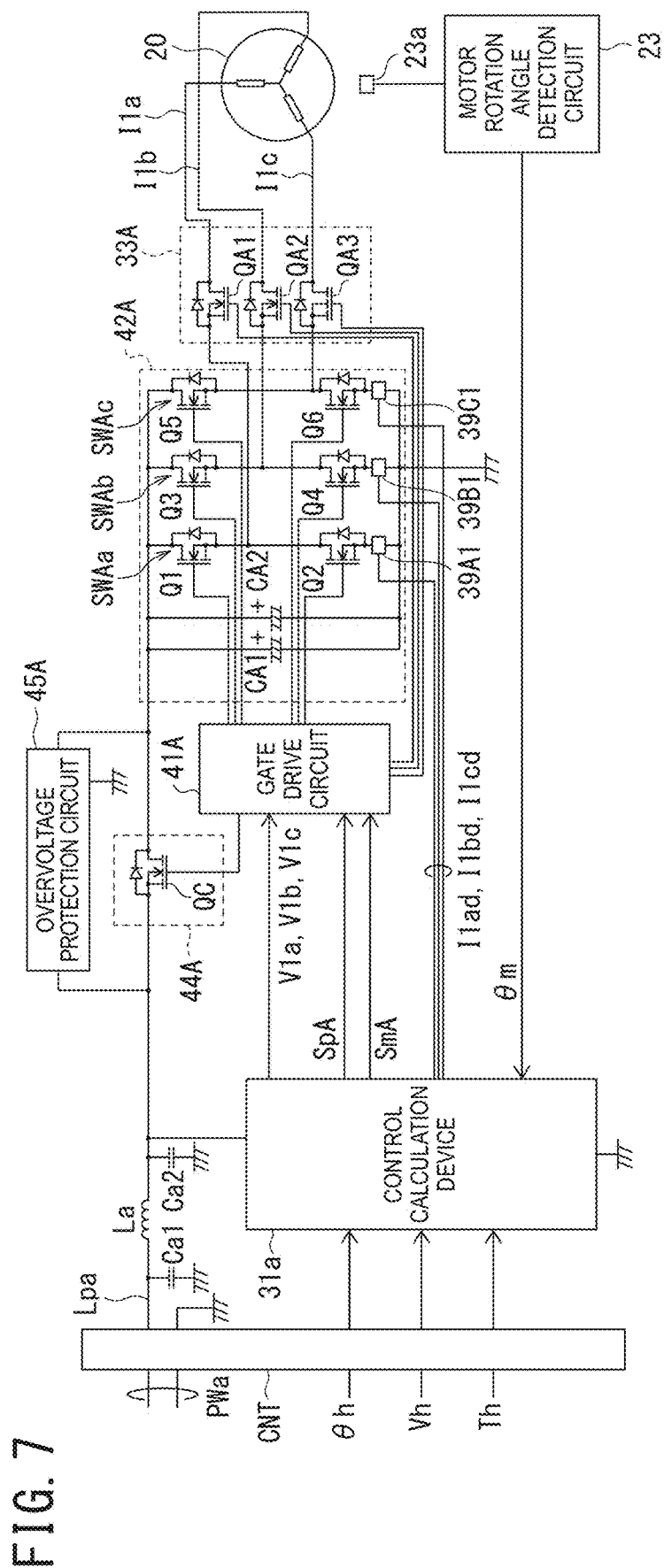
FIG. 7 is a configuration diagram illustrative of an outline of a third variation of the electronic control unit.

(3) FIG. 7 is a configuration diagram illustrative of an outline of a third variation of the ECU 30. The third variation of the ECU 30 drives the motor 20, using a single inverter. Thus, among the first motor current cut-off circuit 33A and the second motor current cut-off circuit 33B, the first gate drive circuit 41A and the second gate drive circuit 41B, the first power conversion circuit 42A and the second power conversion circuit 42B, the first reverse connection protection circuit 44A and the second reverse connection protection circuit 44B, and the overvoltage protection circuits 45A and 45B that are included in the configuration illustrated in FIG. 2, the ECU 30 includes only the first motor current cut-off circuit 33A, the first gate drive circuit 41A, the first power conversion circuit 42A, the first reverse connection protection circuit 44A, and the overvoltage protection circuit 45A.

(4) Although, in the foregoing description, an example in which the power source device of the present invention is applied to an electric power steering device using a column assist system that is referred to as a so-called upstream assist system was described, the power source device of the present invention may be applied to an electric power steering device using a so-called downstream assist system. Hereinafter, as an example of the electric power steering device using the downstream assist system, configuration examples in which the power source device of the present invention is applied to electric power steering devices using a single pinion assist system, a rack assist system, and a dual pinion assist system will be described.

Figure 8:
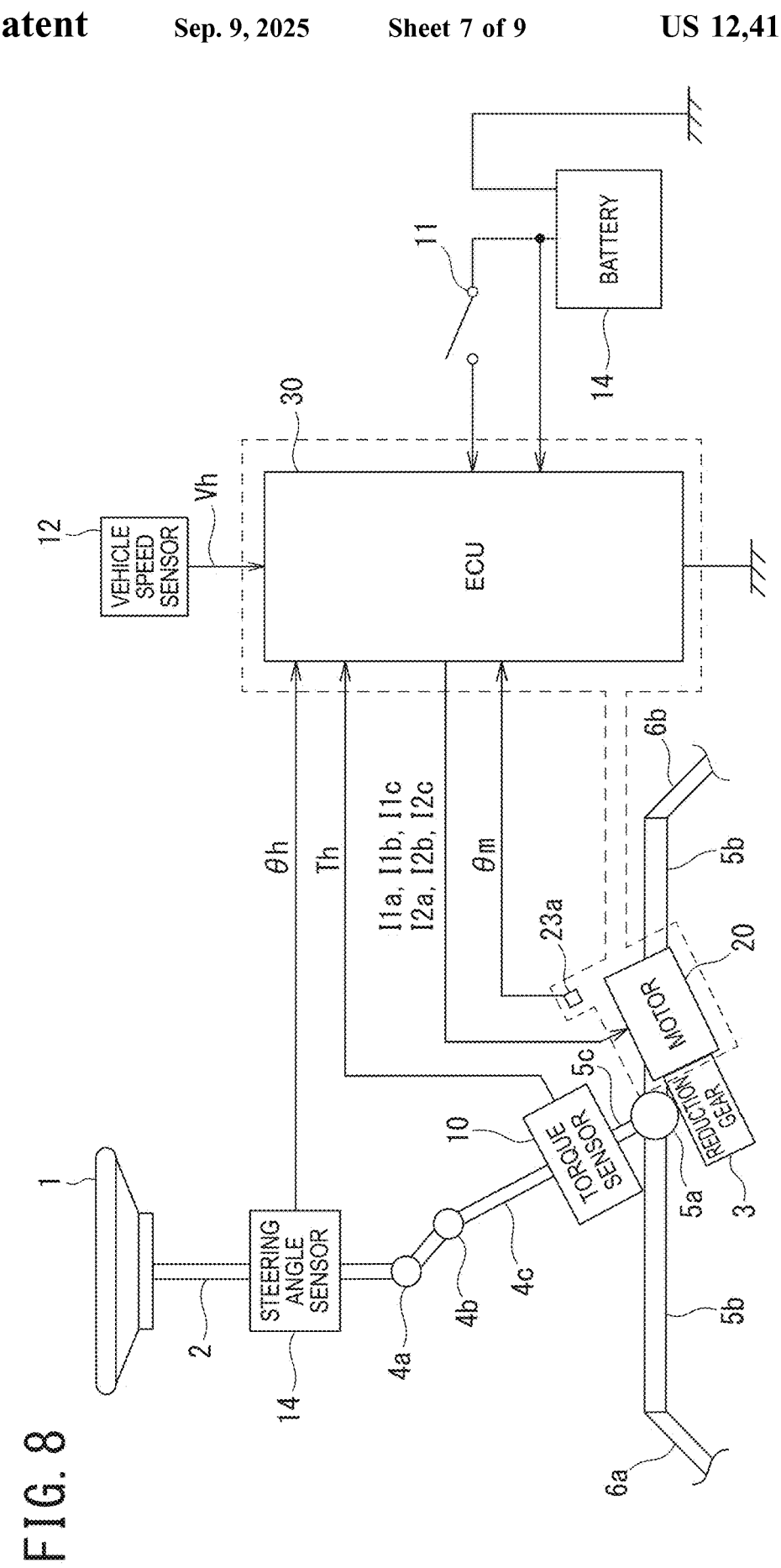
FIG. 8 is a configuration diagram illustrative of an outline of a first variation of the electric power steering device.
Figure 9:
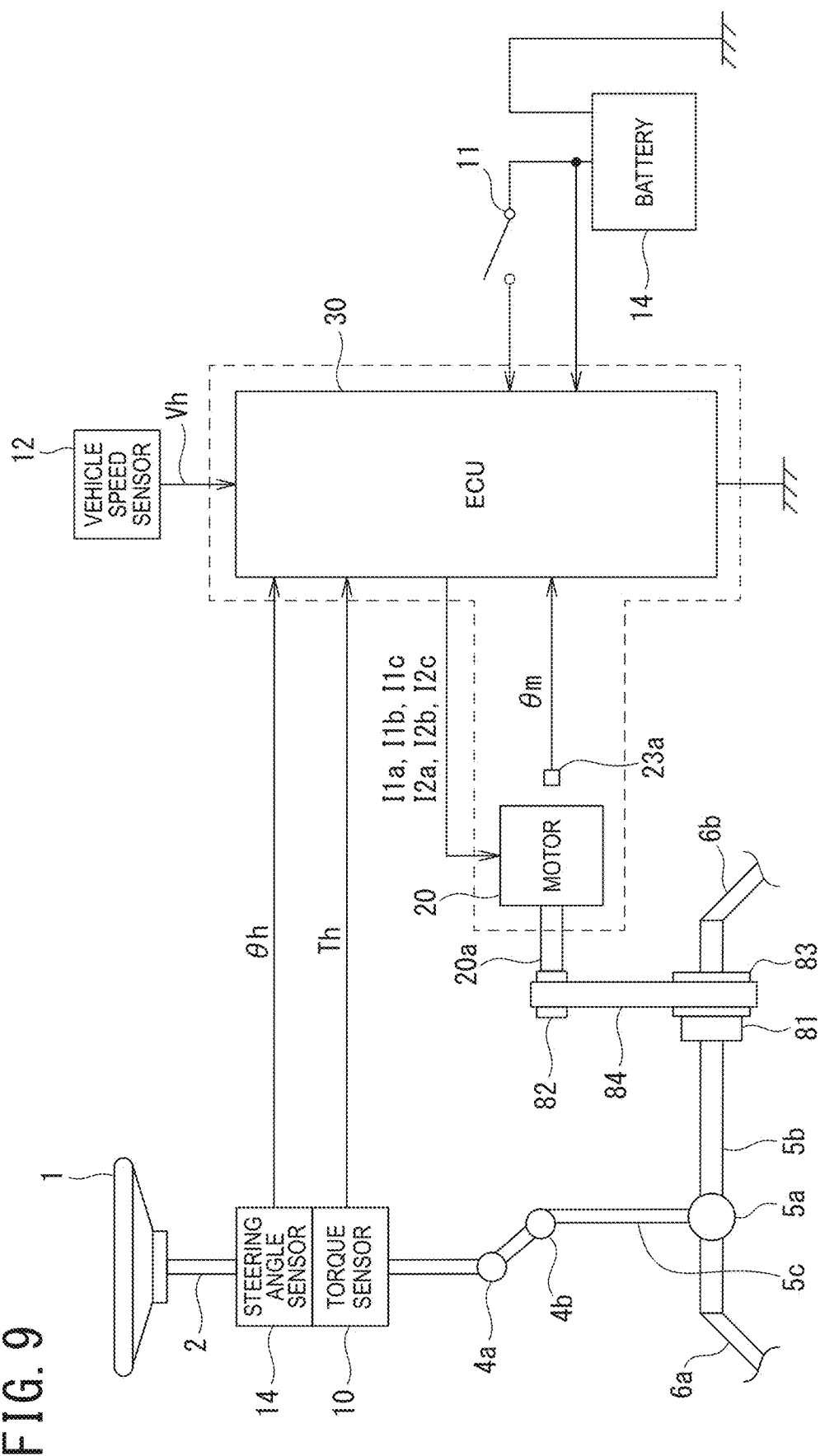
FIG. 9 is a configuration diagram illustrative of an outline of a second variation of the electric power steering device.
Figure 10:
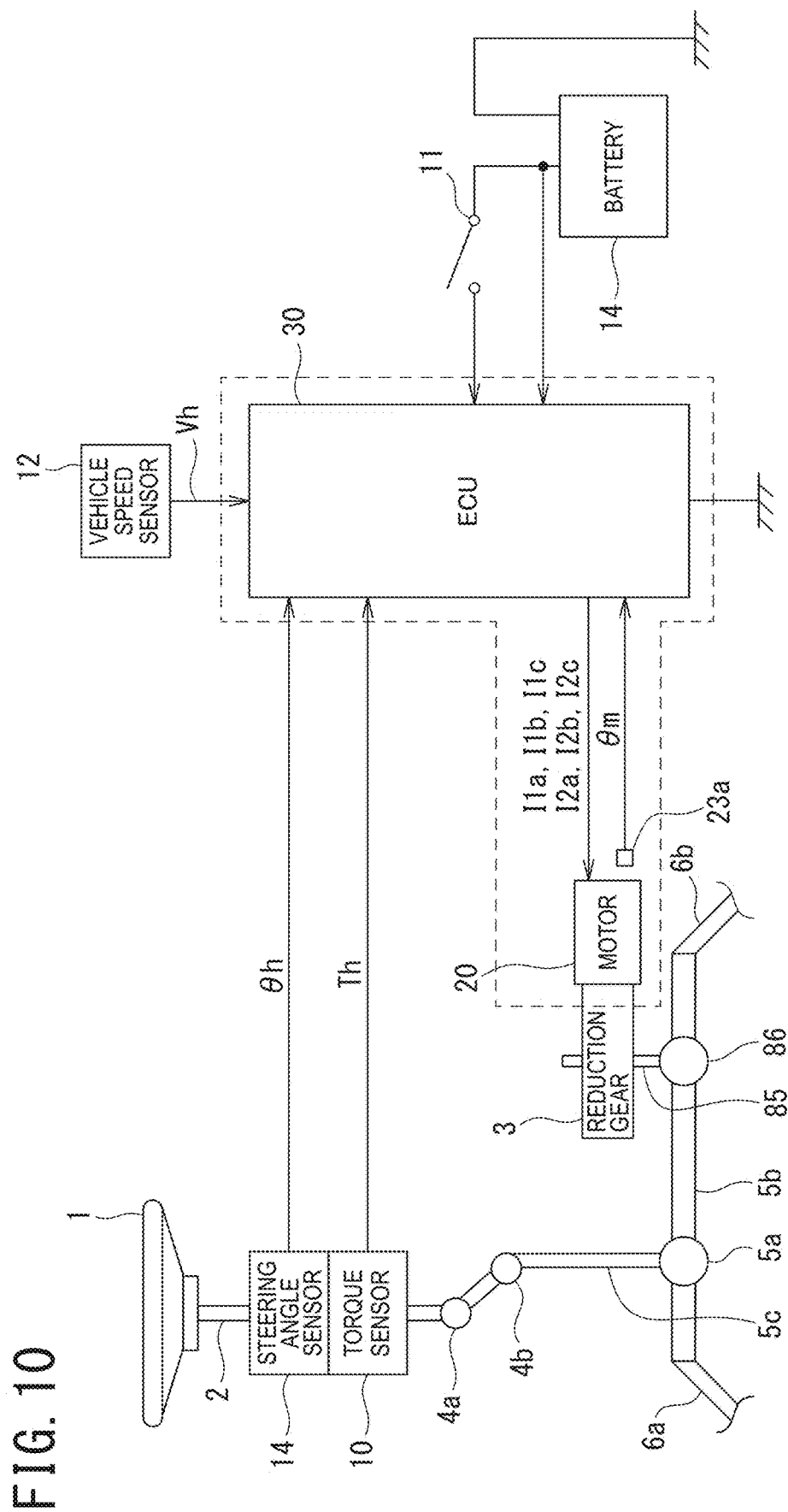
FIG. 10 is a configuration diagram illustrative of an outline of a third variation of the electric power steering device.

Note that, in the case of the downstream assist system, a motor 20, a rotation angle sensor 23a, and an ECU 30 may, instead of being formed as separate entities, be formed as a motor control unit (MCU) having a monolithic structure as a waterproof measure, as illustrated by dashed lines in FIGS. 8 to 10.

FIG. 8 illustrates a configuration example in which the power source device of the present invention is applied to an electric power steering device using the single pinion assist system. A steering wheel 1 is connected to a universal joint 4a at one end of an intermediate shaft via a steering shaft 2.

In addition, to a universal joint 4b at the other end, an input-side shaft 4c of a torsion bar (not illustrated) is coupled.

A pinion rack mechanism 5 includes a pinion gear (pinion) 5a, a rack bar (rack) 5b, and a pinion shaft 5c. The input-side shaft 4c and the pinion rack mechanism 5 are connected by the torsion bar (not illustrated) that is twisted due to a difference in rotation angles between the input-side shaft 4c and the pinion rack mechanism 5. A torque sensor 10 electromagnetically measures a torsion angle of the torsion bar as steering torque Th of the steering wheel 1.

To the pinion shaft 5c, a motor 20 assisting steering force of the steering wheel 1 is connected via a reduction gear 3, and the rotation angle sensor 23a calculates rotation angle information of a motor rotation shaft of the motor 20, as with the above-described embodiment.

(5) FIG. 9 illustrates a configuration example in which the power source device of the present invention is applied to an electric power steering device using the rack assist system. A spiral groove (not illustrated) is formed on an outer circumferential surface of a rack bar 5b, and a spiral groove (not illustrated) of the same lead as the spiral groove on the rack bar 5b is also formed on an inner circumferential surface of a nut 81. By a plurality of rolling elements being arranged in a rolling path formed by the spiral grooves, a ball screw is formed.

A belt 84 is wound around a driving pulley 82 coupled to a rotation shaft 20a of a motor 20 assisting steering force of a steering wheel 1 and a driven pulley 83 coupled to the nut 81, and rotational motion of the rotation shaft 20a is converted to linear motion of the rack bar 5b. A rotation angle sensor 23a calculates rotation angle information of a motor rotation shaft of the motor 20, as with the above-described embodiment.

(6) FIG. 10 illustrates a configuration example in which the power source device of the present invention is applied to an electric power steering device using the dual pinion assist system. The electric power steering device using the dual pinion assist system includes, in addition to a pinion shaft 5c and a pinion gear 5a, a second pinion shaft 85 and a second pinion gear 86, and a rack bar 5b includes first rack teeth (not illustrated) that mesh with the pinion gear 5a and second rack teeth (not illustrated) that mesh with the second pinion gear 86.

To the second pinion shaft 85, a motor 20 assisting steering force of a steering wheel 1 is connected via a reduction gear 3, and a rotation angle sensor 23a calculates rotation angle information of a motor rotation shaft of the motor 20, as with the above-described embodiment.

Advantageous Effects of Embodiment (1) A power source device of the embodiment includes: a DC power source; an inverter to which power is supplied from the DC power source; a capacitor connected between the DC power source and the inverter in parallel with the inverter; a reverse connection protection circuit connected between the DC power source and the capacitor and configured to block current flowing through a positive electrode-side power source line of the DC power source from the capacitor to the DC power source; and an overvoltage protection circuit configured to control both-end voltage across the capacitor to a voltage less than or equal to a predetermined voltage when the both-end voltage becomes greater than or equal to the predetermined voltage.

Because of this configuration, even when in the power source device in which the reverse connection protection circuit configured to block current flowing from the inverter side to the DC power source side is disposed, pulse signals are repeatedly applied to the power source line, the both-end voltage across the capacitor connected in parallel with the inverter can be prevented from becoming excessive.

Thus, a capacitor having a lower withstand voltage can be used as the capacitor connected in parallel with the inverter. Since a capacitor having a low withstand voltage has a larger capacitance than a capacitor having a high withstand voltage, the number of capacitors required to obtain the same capacitance can be reduced. Because of this capability, the number of components, a cost, and mounting area can be reduced.

(2) The overvoltage protection circuit may be a circuit configured to control the both-end voltage to a voltage less than or equal to the predetermined voltage when voltage between a connection point of the reverse connection protection circuit to the DC power source and a connection point of the reverse connection protection circuit to the capacitor becomes greater than or equal to a threshold value. Because of this configuration, the both-end voltage across the capacitor can be prevented from becoming excessive.

(3) The overvoltage protection circuit may be a switching element disposed between a positive electrode of the capacitor and a ground line and configured to conduct when the both-end voltage across the capacitor becomes greater than or equal to the predetermined voltage. For example, the switching element may be a P-channel type field effect transistor or a PNP-type transistor. Because of this configuration, the overvoltage protection circuit can be achieved with a simpler configuration.

(4) A control terminal of the switching element may be connected to a connection point of the reverse connection protection circuit to the DC power source, a first main electrode of the switching element may be connected to a connection point of the reverse connection protection circuit to the capacitor, and a second main electrode of the switching element may be connected to a ground line via a discharge resistor. Because of this configuration, on and off states of the switching element can be controlled according to the both-end voltage across the capacitor.

(5) The predetermined voltage may be less than a withstand voltage of the capacitor. Because of this configuration, a cause of a malfunction of the capacitor due to the both-end voltage across the capacitor exceeding the withstand voltage can be avoided.

(6) The capacitor may be, for example, a hybrid capacitor. Because of this configuration, mounting area of the capacitor can be further reduced.

(7) A rectifying element configured to block current flowing through a positive electrode-side power source line of the DC power source from the DC power source to the capacitor does not have to be arranged. Even without arranging such a rectifying element, the both-end voltage across the capacitor can be prevented from becoming excessive by the overvoltage protection circuit. For example, a switching element including a parasitic diode having a direction blocking current flowing through the positive electrode-side power source line from the DC power source to the capacitor does not have to be arranged.

REFERENCE SIGNS LIST

1 Steering wheel
2 Steering shaft
3 Reduction gear
4a, 4b Universal joint
4c Input-side shaft
5 Pinion rack mechanism
5a Pinion gear (pinion)
5b Rack bar (rack)
5c Pinion shaft
6a, 6b Tie rod
7a, 7b Hub unit
8L, 8R Steered wheel
10 Torque sensor
11 Ignition switch
12 Vehicle speed sensor
13 Battery
14 Steering angle sensor
20 Motor
23 Motor rotation angle detection circuit
30 Electronic control unit (ECU)
31a, 31b Control calculation device
33A First motor current cut-off circuit
33B Second motor current cut-off circuit
39A1, 39A2, 39B1, 39B2, 39C1, 39C2 Current detection circuit
41A First gate drive circuit
41B Second gate drive circuit
42A First power conversion circuit
42B Second power conversion circuit
44A First reverse connection protection circuit
44B Second reverse connection protection circuit
45A, 45B Overvoltage protection circuit
60 Current command value calculation unit
62, 63 Subtracter
64 Current limiting unit
65 PI control unit
66 Two-phase/three-phase conversion unit
67 Three-phase/two-phase conversion unit
68 Angular velocity conversion unit
81 Nut
82 Driving pulley
83 Driven pulley
84 Belt
85 Second pinion shaft
86 Second pinion gear

The invention claimed is:

1. A power source device comprising:
a DC power source;
an inverter to which power is supplied from the DC power source;
a capacitor connected between the DC power source and the inverter in parallel with the inverter;
a reverse connection protection circuit connected between the DC power source and the capacitor and configured to block current flowing through a positive electrode-side power source line of the DC power source from the capacitor to the DC power source; and
an overvoltage protection circuit configured to control both-end voltage across the capacitor to a voltage less than or equal to a predetermined voltage when the both-end voltage becomes greater than or equal to the predetermined voltage, wherein
the overvoltage protection circuit controls the both-end voltage to the voltage less than or equal to the predetermined voltage when voltage between a connection point of the reverse connection protection circuit to the DC power source and a connection point of the reverse connection protection circuit to the capacitor becomes greater than or equal to a threshold value,
the overvoltage protection circuit includes:

a switching element disposed between a positive electrode of the capacitor and a ground line and configured to conduct when the both-end voltage across the capacitor becomes greater than or equal to the predetermined voltage;

a resistor connected between the connection point of the reverse connection protection circuit to the DC power source and a control electrode of the switching element; and a Zener diode connected between the control electrode and a first main electrode of the switching element.

2. The power source device according to claim 1, wherein the switching element is a P-channel-type field effect transistor.

3. The power source device according to claim 1, wherein the switching element is a PNP-type transistor.

4. The power source device according to claim 1, wherein a control terminal of the switching element is connected to the connection point of the reverse connection protection circuit to the DC power source, the first main electrode of the switching element is connected to the connection point of the reverse connection protection circuit to the capacitor, and a second main electrode of the switching element is connected to the ground line via a discharge resistor.

5. The power source device according to claim 1, wherein the predetermined voltage is less than a withstand voltage of the capacitor.

6. The power source device according to claim 1, wherein the capacitor is a hybrid capacitor.

7. The power source device according to claim 1, wherein a rectifying element configured to block current flowing through a positive electrode-side power source line of the DC power source from the DC power source to the capacitor is not arranged.

8. An electric power steering device comprising:

the power source device according to claim 1; and an electric motor driven by the inverter in the power source device, wherein the electric power steering device provides a steering system of a vehicle with steering assist force by the electric motor.

* * * * *